ELECTRICAL WAVE SHAPING APPARATUS AND CONVERSION APPARATUS

Filed Aug. 5, 1965

INVENTOR.
J. VENN LEEDS, JR.,
BY John B. Davidson
ATTORNEY.

United States Patent Office 3,354,377

Patented Nov. 21, 1967

3,354,377

ELECTRICAL WAVE SHAPING APPARATUS AND CONVERSION APPARATUS

J. Venn Leeds, Jr., Houston Tex., assignor to Esso Production Research Company, a corporation of Delaware Filed Aug. 5, 1965, Ser. No. 477,404
4 Claims. (Cl. 321—8)

Figure 1:
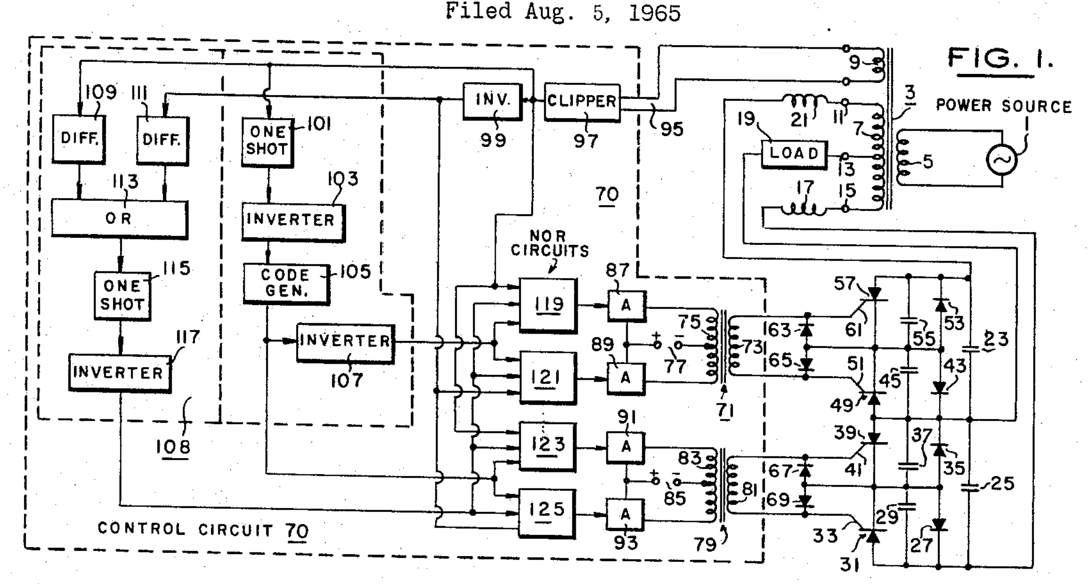

This invention relates generally to electrical wave shaping apparatus, and more particularly to apparatus for varying in sinusoidal electrical signal between two phase relationships in accordance with a binary code.

The use of constant frequency, sinusoidal, electrical signals switched back and forth between opposite phases in accordance with a binary code is known to the art. For example, such an electrical signal has found utility in driving an electroseismic wave transducer for the purpose of injecting psuedo-random seismic signals into the earth in connection with the continuous wave seismic technique of geophysical prospecting. Unfortunately, prior art electrical apparatus for producing such a signal have been relatively limited insofar as power capability is concerned. As a result, hydraulic amplifiers have had to be used to amplify the relatively weak electrical signal to a point where an earth vibrator may be driven thereby. Since hydraulically driven vibrators usually are quite large and very heavy, their use in rough country or swampy country is difficult, if not impossible. Electrodynamic vibrators are far more flexible since they are small, can be used in arrays, and are relatively portable, but power amplifiers available heretofore have suffered from low efficiency and relatively small power capability.

In accordance with one aspect of the invention, a power source means, such as a transformer adapted to be connected to an A.C. source, is provided with an output circuit having first and second outer terminals and a neutral terminal, which may be a center tapped secondary winding. The A.C. source may be of regulated frequency or of variable frequency, as desired. A load is coupled between the center tap and each of the outer terminals of the secondary winding by means of a pair of bridge rectifiers, each bridge rectifier having a shorted output and each having a controlled rectifier in each conduction path thereof. A binary code generator is provided for producing pulses variable between two states in accordance with a desired code sequence. Circuit means is provided which is connected to the controlled rectifiers so that pulses are applied to the controlled rectifiers in one bridge rectifier when the binary code generator produces pulses of one state so as to fire the controlled rectifiers in alternation, and so that pulses are applied to the controlled rectifiers in the other bridge rectifier when the binary code generator produces pulses of the other state to alternately fire the controlled rectifiers in that bridge rectifier. A synchronizing circuit coupled to the first circuit means, to the binary code generator, and adapted to be coupled to the A.C. source, is provided to synchronize the operation of the binary code generator, the A.C. source, and the first circuit means so that the controlled rectifiers are activated at polarity reversals of the voltage applied thereto and so that the binary code generator is switched from one state to another in timed-spaced relationship to cyclic polarity reversals of the voltage of the A.C. source.

Figure 2:
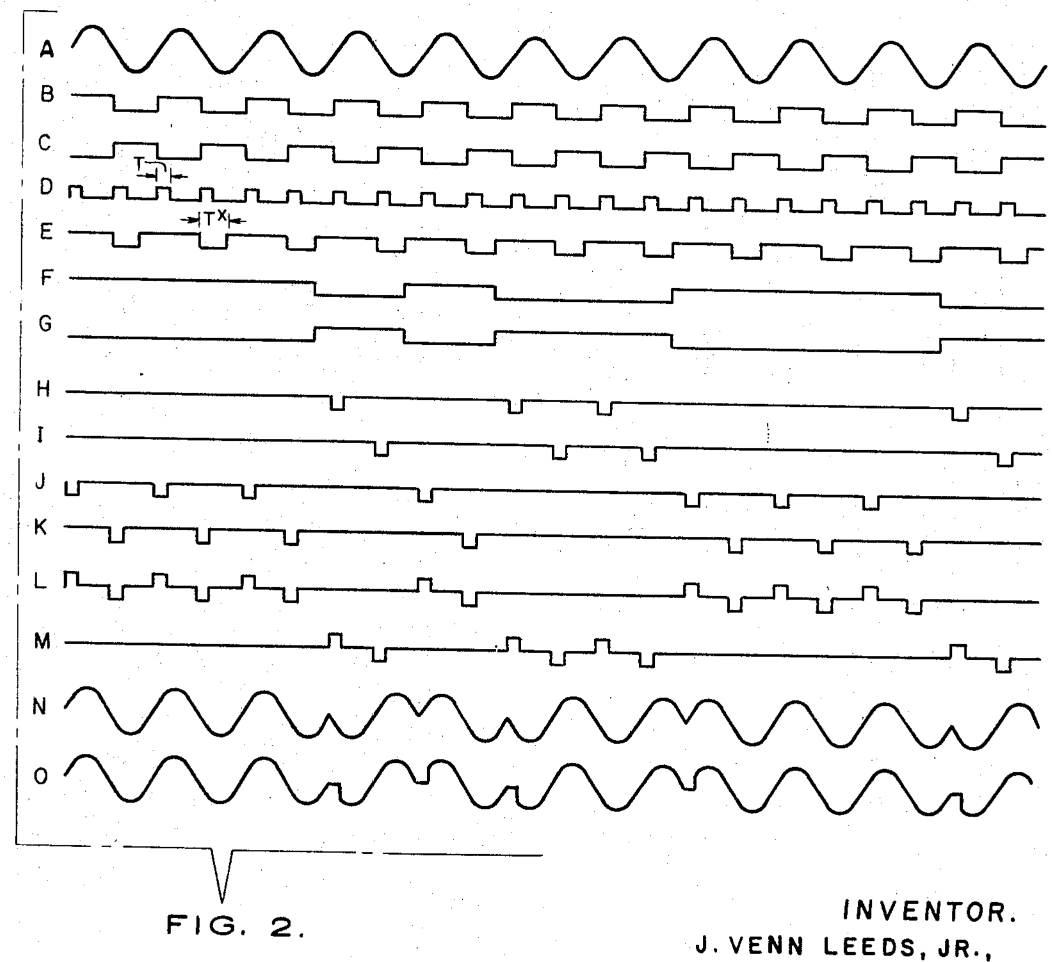

Objects and features of the invention not apparent from the above discussion will become evident upon consideration of the following detailed description thereof when taken in connection with the accompanying drawings, wherein:

FIG. 1 is an electrical schematic diagram of a preferred embodiment of the invention; and FIG. 2 is a waveform representation of voltages at various points in the circuit of FIG. 1, which is useful in undertsanding the operation of the embodiment of the invention illustrated in FIG. 1.

With reference now to FIG. 1, there is shown a circuit for driving a load 19, which may be the actuating winding of an earth vibrator, from an alternating current power source 1, with current which is varied back and forth between mutually opposite phases in accordance with the output signal of a binary code pulse generator 105 and which is derived from an alternating current power source 1. The alternating current source 1 produces a substantially sinusoidal output voltage of constant frequency. The frequency of the source is not critical and may, for example, be 60 cycles, 400 cycles, or 1000 cycles per second, depending upon the design of the electrical generator. Code generator 105 preferably is of the type illustrated in U.S. Patent 3,119,097, Tullos, wherein a binary code signal of maximal length is produced responsive to actuating clock signals of constant repetition rate or frequency which is fed thereto. The alternating current source 1 is coupled to the primary winding 5 of transformer 3, which has a center tapped secondary winding 7 and an auxiliary secondary winding 9. The outer terminals 11 and 15 of winding 7 are respectively connected to inductors 21 and 17, the function of which will become evident below. Load 19 is connected between the center tap terminal 13 and the outer terminals 11 and 15 of winding 7 through inductors 21 and 17 and a pair of bridge rectifiers, each of the bridge rectifiers having a shorted secondary and each having a controlled rectifier in each of the conductive paths thereof. More specifically, load 19 is connected to terminal 11 through inductor 21 and the bridge rectifier comprising half-wave rectifiers 43, 53, 57, and 49, and is connected to terminal 15 by means of inductor 17 and the bridge rectifier comprising half-wave rectifiers 35, 27, 31, and 39. Rectifiers 57, 49, 39, and 31 are controlled rectifiers such as ignitrons or silicon controlled rectifiers, which respectively include control electrodes 61, 51, 41 and 33. The anode terminals of rectifiers 53 and 43 are connected together and to the cathode terminals of rectifiers 57 and 49, while the anode termnials of rectifiers 27 and 35 are connected together and to the cathode terminals of rectifiers 31 and 39. Thus, in effect, the output circuit of each of the bridge rectifiers is short-circuited so that controlled rectifiers 31, 39, 49, and 57 respectively control the current flowing through rectifiers 35, 27, 53, and 43. Small capacitors 55, 45, 37, and 29 are respectively connected across the controlled rectifiers 57, 49, 39, and 31 to prevent the dv/dt rating of the silicon controlled rectifiers from being exceeded. These capacitors may be of about 0.03 microfarad. Capacitors 23 and 25 are respectively connected between inductors 21 and 17 and load 19 for the purpose of preventing accidental firing of the silicon controlled rectifiers. Half-wave rectifiers 63, 65, 67, and 69, which are connected between the control electrodes and cathodes of controlled rectifiers 57, 49, 39, and 31, respectively, are for the purpose of providing a guided path for the firing pulse from transformer windings 73 and 81, respectively.

Control circuit 70 provides gating signals in the correct phase with the supply voltage to control the firing of the silicon controlled rectifiers. The circuit is connected to the control electrode of each of the controlled rectifiers to render conductive the controlled rectifiers in one of the bridge rectifiers when the code generator 105 produces a binary 1 signal at a polarity reversal of the supply voltage from a given polarity to the opposite polarity, and to render conductive the controlled rectifiers in the other bridge rectifier when the code generator produces a binary 0 signal at a polarity reversal of the supply voltage from the given polarity to the opposite polarity. Control electrodes 51 and 61 of rectifiers 49 and 57, respectively, are connected to the outer terminals of the secondary winding 73 of the transformer 71, and the control electrodes 33 and 41 of rectifiers 31 and 39, respectively, are connected to the outer terminals of the secondary winding 81 of transformer 79. Transformers 71 and 79 each have a center tapped primary, which are designated by the reference numerals 77 and 85, respectively. Amplifiers 87 and 89 are each connected across half of primary winding 75 so that pulses of the same polarity produced thereby will produce pulses of opposite polarity across secondary winding 73. Amplifiers 91 and 93 are similarly connected to primary winding 83 so that pulses of opposite polarity will be produced across secondary winding 81 when pulses of the same polarity are respectively produced by amplifiers 91 and 93. Amplifiers 87, 89, 91, and 93 are respectively driven by NOR circuits 119, 121, 123, and 125, each of which has three control circuits. The NOR circuits may be of the type described in General Electric Transistor Manual, 5th edition, General Electric Company, Liverpool, New York, pp. 131–133, wherein an output signal is developed when no signal is present at any of the control circuits thereof.

The control signals for the NOR circuits are derived from the secondary winding 9 of transformer 3 and from the code generator 105. The signals from winding 9 are fed on line 95 to clipper 97. These signals are depicted in FIG. 2 by waveform A. Clipper 97, which preferably is unipolar, produces a rectangular wave output signal shown in FIG. 2 as waveform B. These rectangular wave signals are inverted in polarity by inverting circuit 99 (see waveform C). Both the output signals of clipper 97 and the output signals of inverter 99 are applied to circuit 108 which is operative to produce a pulse at each polarity reversal of the output voltage across winding 9. Circuit 108 comprises differentiating circuits 109 and 111 for producing an output signal indicative of the differential of the output signals from clipper 97 and inverter 99, respectively, an OR circuit 113 for combining the differentiated output signals of circuits 109 and 111, a one-shot multivibrator 115 for producing an output pulse of adjustable time duration responsive to each pulse from OR circuit 113, and a polarity-inverting circuit 117 for producing an output pulse of correct polarity for application to the NOR circuits. The output signal from inverter 117 is depicted as waveform D in FIG. 2.

The output signals from clipper 97 are also applied to a monostable multivibrator 101, the output signal of which is inverted in polarity by inverter 103 to produce waveform E, FIG. 2, for triggering code generator 105 at time-spaced intervals equal to the period of the output voltage appearing across winding 9 to activate code generator 105 so that the code generator will produce an output signal variable between two amplitudes in accordance with a desired binary code sequence, such as a binary code sequence of maximal length. The output waveform of code generator 105 is indicated by waveform F in FIG. 2. The output signal of code generator 105 is applied to polarity inverter 107 to produce waveform G. The code generator changes state only at the end of a pulse from inverter 103 (see waveforms E and F of FIG. 2). This occurs after inverter 117 has returned to the "on" condition. In this manner, misfires are prevented.

The output signals of clipper 97 also are applied to control circuits of NOR circuits 119 and 123, and the output signals of inverter 99 are applied to control circuits of NOR circuits 121 and 125. The output signals of inverter 107 are applied to control circuits of NOR circuits 119 and 121, while the output signals of inverter 117 are applied to control circuits of all of the NOR circuits 119, 121, 123, and 125. The output signal of code generator 105 is applied to control circuits of NOR circuits 123 and 125.

It is to be understood that the binary code signal illustrated by waveform F is purely arbitrary. The particular signal shown could indicate the binary code 00010110001, each digit of the binary code being indicated by a particular polarity over a complete cycle of the sinusoidal voltage indicated by waveform A.

As mentioned above, a NOR circuit produces an output signal when no output signal is present at any of the input or control circuits thereof. From an inspection of waveforms B, C, D, E, F, and G, it is readily apparent that waveforms H, I, J, and K, will be produced by NOR circuits 119, 121, 123 and 125, respectively, assuming that the waveforms B through G are applied to the control circuits of the NOR circuits as indicated in FIG. 1. The output signals of the NOR circuits are amplified by amplifiers 87, 89, 91, and 93, and the output signals of amplifiers 87 and 89 are combined in the secondary of transformer 74, while the output signals of amplifiers 91 and 93 are combined in the secondary winding 81 of transformer 79. Waveform L indicates the waveform that will be produced across winding 81 by signals having the waveforms J and K, and waveform M is the shape of the signal that will appear across secondary winding 73, assuming that signals having the shape of waveforms J and K are applied to the primary winding of transformer 74. When the pulses of alternate polarity appear across winding 73, controlled rectifiers 57 and 49 will be fired in alternation so that the voltage appearing between terminals 11 and 13 is applied to load 19. Likewise, when pulses of alternate polarity appear across the secondary winding 81, controlled rectifiers 31 and 39 will be fired in alternation so that the voltage appearing between terminals 13 and 15 is applied to load 19. Since the voltage appearing between terminals 11 and 13 is in opposite phase relationship to the voltage appearing between terminals 15 and 13, the voltage applied to load 19 will reverse in phase when pulses are no longer produced across one of the secondary windings and appear at the other secondary windings of transformers 71 and 79. The pulses are produced across the appropriate secondary windings at the beginning of each half cycle so that the appropriate silicon controlled rectifier that would conduct on that particular half cycle is always fired. During commutation with inductive loads, both of the bridge rectifiers are conducting simultaneously, and, for this reason, inductors 17 and 21 are included in the circuit to prevent the current from becoming excessive. In the example the output voltage wave form N is produced with a resistive load, and the output wave form O is typical of the wave form produced with an inductive load.

Capacitors 23 and 25 in conjunction with inductors 21 and 17 limit the rate of voltage rise across the bridge which is conducting but is being shut off From the above it can be seen that the invention is adapted to produce a reverse sine wave signal variable between mutually opposite phases in accordance with a desired binary code. A standard alternating current generator can be used as a power source, and the cost of converting a sine wave signal produced by such a generator into a reverse sine wave signal is only of the order of 5% in efficiency. The apparatus is small and relatively light, and thus presents no problem insofar as portability is concerned. The efficiency of the unit is high enough to supply the field of electrodynamic vibrators so that the need for a special field supply is eliminated, and only two wires need be run to the vibrator.

Having described the principle of the invention and the best mode in which I have contemplated appling that principle, I wish it to be understood that the apparatus described is illustrative only and that other means can be employed without departing from the true scope of the invention as defined in the following claims.

What is claimed is:

1. Apparatus for controlling the phase of an alternating current applied to a load in accordance with a binary code sequence, comprising:

power source means for connection to an alternating current source having a center tapped output circuit including outer terminals;

means for connecting the load between the center tap of said output circuit and each of the outer terminals of said output circuit including first and second bridge rectifiers, each bridge rectifier having a shorted output and each having a controlled rectifier in each conduction path thereof;

binary code generator means for producing pulses variable between two states in accordance with a binary code sequence;

circuit means connected to the controlled rectifiers to actuate the controlled rectifiers in one bridge rectifier when the binary code generator means produces pulses of one state to fire said controlled rectifiers in said one bridge rectifier in alternation, and to actuate the controlled rectifiers in the other bridge rectifier in alternation when the binary code generator means produces pulses of the other state; and a synchronizing circuit coupled to said circuit means, to said binary code generator means, and adapted to be electrically coupled to the alternating current source for synchronizing the operation of the binary code generator means, the alternating current source, the first circuit means, and the controlled rectifiers so that the controlled rectifiers are actuated at polarity reversals of the voltage applied thereto from said alternating current source, and so that the output of said binary code generator means is switched from one state to the other in time-spaced relationship to cyclic polarity reversals of the voltage of said alternating current source.

2. Apparatus for controlling the phase of an alternating current applied to a load in accordance with the pulsed output signal of a binary code pulse generator, comprising:

power source means having a balanced output circuit winding having first and second outer terminals and a neutral terminal;

first and second circuit means including first and second circuit output bridge rectifiers for connecting the load between the neutral terminal and said first and second outer terminals, each of said first and second bridge rectifiers including a controlled rectifier having a control electrode for controlling current conduction therethrough in each of the conduction paths thereof; and circuit means coupled to the control electrode of each of said controlled rectifiers and for connection to the code generator to render conductive the controlled rectifiers in said first bridge rectifier when said code generator produces a binary 1 signal at a polarity reversal across said balanced output circuit from a given polarity to the opposite polarity, and to render conductive the controlled rectifiers in said second bridge rectifier when said code generator produces a binary 0 signal at a polarity reversal across said balanced output circuit from said given polarity to the opposite polarity.

3. Apparatus for controlling the phase of an alternating current applied to a load in accordance with the pulsed output signal of a binary code pulse generator, comprising:

power source means having a primary winding for connection to a source of alternating current and a center tapped secondary winding having two outer terminals and a center tap terminal;

first and second circuit means including first and second shorted output bridge rectifiers for connecting the load between the center tap of said secondary winding and said first and second outer terminals, each of said first and second bridge rectifiers including a controlled rectifier having a control electrode for controlling current conduction therethrough in each of both conduction paths of each bridge rectifier;

first and second control circuit means respectively connected to the controlled rectifier control electrodes in said first and second bridge rectifiers, said first control circuit means being adapted to produce activating pulses to render conductive the controlled rectifiers connected thereto in alternation responsive to reception of binary 1 signals from the code generator, and said second control circuit means being adapted to produce activating pulses to render conductive the controlled rectifiers connected thereto in alternation responsive to reception of binary 0 signals from the code generator; and circuit means for correlating production of binary signals by said code generator with polarity reversals from a given polarity of the alternating current voltage applied to said primary winding.

4. Apparatus for controlling the phase of an alternating current applied to a load in accordance with the pulsed output signal of a binary code pulse generator, comprising:

transformer means having a primary winding for connection to a source of alternating current and a center tapped secondary winding having two outer terminals and a center tap terminal;

first and second circuit means including first and second shorted output bridge rectifiers for connecting the load between the center tap of said secondary winding and said first and second outer terminals, each of said first and second bridge rectifiers including a controlled rectifier having a control electrode for controlling current conduction therethrough in each of both conduction paths of each bridge rectifier;

clipper means connected to said secondary winding for clipping the sinusoidal voltage appearing there-across to form a substantially rectangular waveform signal;

first polarity inverting means connected to said clipper means operative to invert the polarity of the clipper means output signal;

first circuit means connected to the output of said clipper means and to the output of said polarity inverting means to produce a pulse at each polarity reversal of the output signal thereof;

a monostable multivibrator connected to the output of said first circuit means to produce an output pulse of predetermined duration responsive to each pulse from said first circuit means;

second circuit means connected to said clipper means for producing triggering pulses at the beginning of each output pulse of said clipper means;

pulse code generator means adapted to produce a binary pulse code signal wherein the output signal thereof represents a binary 1 bit at one signal level and represents a binary 0 bit at another signal level, the signal bit duration being equal to the time between triggering pulses from said second circuit means;

second polarity inverting means connected to said pulse code generator means for inverting the polarity of the output signal of said pulse code generator means;

first logic circuit means connected to said second inverting means, to said monostable multivibrator, to said clipper means, and to said first inverting means for producing triggering pulses of opposite polarity in alternation responsive to production of a binary 1 bit signal by said pulse code generator means;

first coupling circuit means for coupling the output signals of said first logic circuit means to the controlled rectifier control electrodes in said first bridge rectifier to fire one controlled rectifier with triggering pulses of one polarity and to fire the other controlled rectifier with triggering pulses of the opposite polarity;

second logic circuit means connected to said monostable multivibrator, to said code generator means, to said clipper means, and to said first inverting means for producing triggering pulses of opposite polarity in alternation responsive to production of binary 0 bit signals by said pulse code generator means;

second coupling circuit means for coupling the output signals of said second logic circuit means to the controlled rectifier control electrodes in said second bridge rectifier to fire said one controlled rectifier thereof with triggering pulses of one polarity and to fire the other controlled rectifier thereof with triggering pulses of the opposite polarity.

No references cited.

JOHN F. COUCH, *Primary Examiner.*

WARREN E. RAY, *Examiner.*